Sept. 4, 1923.
F. A. EUSTIS ET AL
1,466,793
PROCESS OF SEPARATING AND RECOVERING IRON AND ZINC FROM SULPHIDE ORES
Filed Sept. 29, 1922
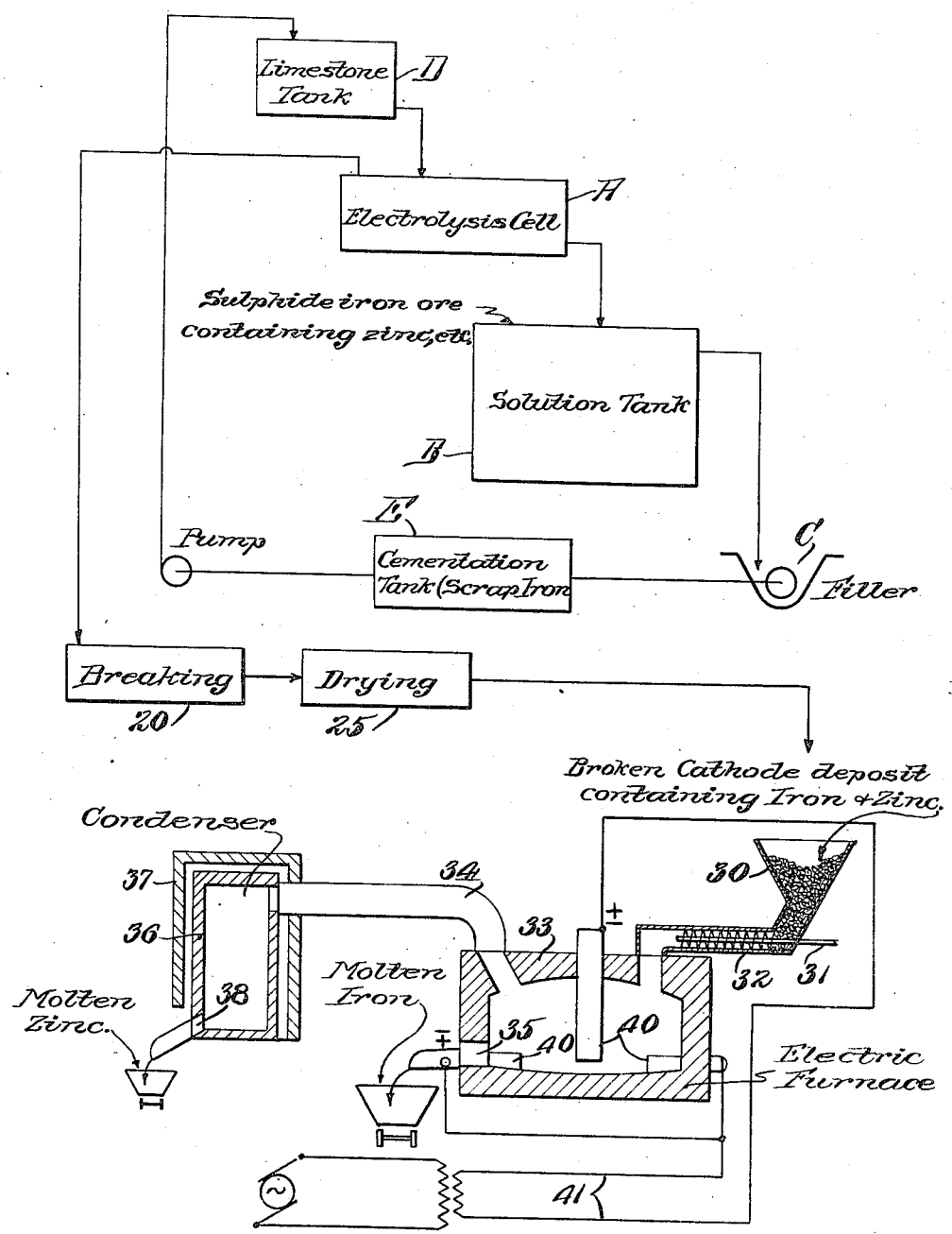

Patented Sept. 4, 1923.

1,466,793

UNITED STATES PATENT OFFICE.

FREDERIC A. EUSTIS, OF MILTON, AND DONALD BELCHER, OF BOSTON, MASSACHUSETTS, ASSIGNORS OF ONE-HALF TO SAID EUSTIS AND ONE-HALF TO CHARLES PAGE PERIN, OF NEW YORK, N. Y.

PROCESS OF SEPARATING AND RECOVERING IRON AND ZINC FROM SULPHIDE ORES.

Application filed September 29, 1922. Serial No. 591,270.

*To all whom it may concern:*

Be it known that we, FREDERIC A. EUSTIS and DONALD BELCHER, citizens of the United States of America, and residents of Milton and Boston, respectively, in the counties of Norfolk and Suffolk, and State of Massachusetts, have invented new and useful Improvements in Processes of Separating and Recovering Iron and Zinc from Sulphide Ores, of which the following is a specification.

There are many ores which carry a large percentage of iron sulphide and relatively small quantities of copper, gold and silver, which often occur together, and there are other iron sulphides which carry as important minor metals nickel, cobalt and sometimes cadmium.

Such ores frequently include important quantities of zinc.

In Letters Patent of the United States No. 1,412,174, granted to us and others April 11, 1922, for the art of making electrolytic iron, there is described among other things a process of producing iron by electrolysis from iron sulphides; and in our application Serial No. 566,581, filed June 7, 1922, (of which this application is a continuation in part) we have described a process having the advantages of the process of our said Patent No. 1,412,174 for treating the above-mentioned class of ores containing associated metals, and resulting in recovering not only the iron and the sulphur, but also the other associated metals.

The process in general, according to our said application, comprises treating the mixed sulphide iron ores carrying the associated metals by leaching the material with ferric chloride to dissolve the iron and a part at least of the associated metals, removing the associated metals soluble by this step by selective precipitation, and electrolyzing the iron solution, the anode liquor being returned to the leaching tank. Unless special steps are taken, the zinc content tends to build up in the circulated solution.

In respect to recovering the zinc, our said application Serial No. 566,581 described alternative procedures including electro-deposition of zinc (when the solution had built up to a sufficient concentration) at the cathode along with the iron, and subsequent heating to drive off the zinc by volatilization, but elected to claim species of the process in which the zinc, if any, was precipitated from the solution prior to electrolysis.

The present invention relates to the recovery and separation of zinc and iron, or similarly related metals, by electrolysis from mixed ores, such as sulphides of zinc and iron, and apparatus therefor.

Such mixed sulphides are very common in nature and in many ores, which may be treated to advantage by the process described in our said application Serial No. 566,581, zinc is found in such quantities and under such conditions that it can not be commercially recovered under processes at present known. The present invention makes possible the recovery of zinc at profit from such ores, with simultaneous recovery of pure iron.

The invention will best be understood by reference to a typical recommended procedure illustrated in the accompanying drawing, in which the figure is a diagram explanatory of the preferred steps of the process and showing certain recommended types of apparatus for practising certain of said steps.

Referring to the drawing, the process may be carried out as follows:

The sulphide ores containing zinc and iron and other metals if present, will be first finely ground. If much of the iron is present as pyrites, the ores will then be heated as described in our said Patent No. 1,412,174, in order to remove one atom of sulphur from the pyrite. The material will then be fed into the solution tank B. In this tank the iron, zinc and such other metals as copper, nickel, cobalt and cadmium, if present, will be taken into solution and at the same time the solution will be chemically reduced. A suitable solvent is, for example, a mixture of ferric chloride and ferrous chloride, containing 72 grams of iron per liter of ferric chloride and 72 grams of iron per liter of ferrous chloride, with or without other inert chlorides such as calcium chloride. A clear solution, such as above, may be prepared from pure salts without residue and without the addition of acid or other substance.

The reduced ferrous liquor containing the iron and other associated metals in solution is then passed to the filter C, where the insoluble materials including silica, precipitated sulphur and any other materials such as gold and silver that have not been dissolved, will be collected as a filter cake from which the sulphur, gold and silver may be recovered by known methods. The clear solution of ferrous iron bearing also the zinc, copper and other associated metals, if present, will then be delivered into the cementation tank E containing scrap or other metallic iron which precipitates the copper as cement copper, and also largely precipitates any gold or silver taken into the solution. The other associated metals, if present may be treated as described in our said application Serial No. 566,581, selectively to precipitate them from the solution.

From the cementation tank E the clear solution of ferrous chloride, carrying also the zinc, is pumped through tank D containing limestone to the cathode compartment of the electrolysis cell A. The limestone in tank D is preferred to be employed as a safeguard to neutralize any remaining traces of ferric chloride, and to insure that the solution shall be neutralized and enter the electrolysis cell in a ferrous state.

If desired the solution, before reaching the electrolysis cell A, may be purified from arsenic, antimony or other impurities by selective precipitation or combination, as described in our said application, Serial No. 566,581.

If it is not sufficiently hot, the solution is heated to approximately the boiling point.

In the electrolysis cell A iron and zinc is deposited on the cathode, and the solution is regenerated, a part of the ferrous chloride becoming ferric chloride. The anode liquor containing the ferric chloride is then delivered to the solution tank B to be used over again, thus completing the cycle.

Any suitable form of electrolysis tank, such as that described in our Patent No. 1,412,174, or that described in our said application Serial No. 566,581, may be used. Since according to the present invention the metal is to be remelted, a simple form of electrolysis tank without provision for homogeneous deposit is preferred.

The combined metals, iron and zinc, as deposited, contain much hydrogen and will therefore be brittle, which makes it possible to remove them from fixed, solid or flexible cathodes with great ease.

The deposited mixed metal at the cathodes is now from time to time or continuously stripped from the cathodes, broken up at 20, dried at 25 and delivered to apparatus for practising the further steps, raising the temperature of the metal in successive stages above the volatilization-point of zinc, and above the melting-point of iron in a reducing atmosphere; conducting away the zinc vapors; condensing these vapors in a reducing atmosphere; casting the collected molten zinc in ingots; and drawing off and casting the molten iron residue in suitable ingots (or puddling for a ductile mass, if so preferred).

The drawing indicates the preferred apparatus. Delivery of the broken cathode deposit may be into a hopper 30 arranged to deliver to a feed screw 31 in a pipe 32, screw 31 and the material acting as a seal for the enclosed electric furnace 33 having a vapor duct 34 and a tap-gate 35 for the molten iron, a pool of which is maintained in the bottom of the furnace. The furnace 33 may be of any desired type capable of maintaining a temperature above that of molten iron in a chamber inaccessible to oxygen or other combining elements. The purposes of this furnace include distillation of the zinc without chemical reactions and melting the iron into a homogeneous liquid mass without other flux than the zinc.

Duct 34 delivers into a condenser 36, preferably maintained by insulation 37 at a temperature above the melting point of zinc. The molten zinc from condenser 36 may be tapped off through gate 38.

In operation, the feed-screw 31 delivers new material into the pool of molten metal in furnace 33 at a rate not too great to counterbalance the heating effect of the charge-resistance electrical heating indicated by the electrodes 30 and circuit 41, or of whatever temperature-maintaining heating device, operating without chemical reactions on the charge and the contained vapors, may be substituted for said electrodes and circuit. Each accession of a portion of the cathode deposit is in turn raised by the molten pool in the furnace to a temperature melting and then driving off in vapor the zinc, and then melting the iron.

We claim:

1. The art of treating ores containing iron and zinc comprising subjecting the ores to solution and the solution to electrolysis for the recovery of a cathode deposit of mixed iron and zinc, and subjecting the said deposit to temperatures above the volatilization point of zinc, whereby to drive off the zinc by volatilization and recover pure iron.

2. The art of treating ores containing iron and zinc comprising subjecting the ores to solution and the solution to electrolysis for the recovery of a cathode deposit of mixed iron and zinc, and subjecting the said deposit to temperatures above the volatilization point of zinc in a reducing atmosphere, and removing and condensing the vapor to recover metallic zinc.

3. The art of treating ores containing iron and zinc comprising subjecting the ores to solution and the solution to electrolysis for the recovery of a cathode deposit of mixed iron and zinc, and subjecting the said deposit to temperatures above the melting point of iron, whereby to drive off the zinc by volatilization and recover pure iron in a molten state.

4. The art of recovering zinc from iron sulphide ores comprising forming an electrolyte containing iron and salts of zinc, depositing the said metals as a cathode deposit by electrolysis, subjecting the cathode deposit to distillation at a temperature in excess of the vaporization temperature of zinc and condensing the vapor.

5. The art of recovering zinc from iron sulphide ores comprising forming an electrolyte containing iron in the ferrous state and salts of zinc, depositing the said metals as a cathode deposit by electrolysis, subjecting the cathode deposit to distillation at a temperature in excess of the vaporization temperature of zinc in a reducing atmosphere and condensing the vapor.

6. The art of recovering zinc and iron from sulphide ores comprising subjecting suitably prepared ore to leaching with an iron solution, causing the solution to be selectively precipitated in respect to other of the contained metals than iron and zinc, subjecting the solution to electrolysis to recover a cathode deposit of mixed iron and zinc, and subjecting the cathode deposit so obtained to fractional distillation to separate the pure iron and pure zinc.

7. The art of recovering zinc and iron from sulphide ores containing other valuable metals comprising subjecting suitably prepared ore to leaching with an iron solution, removing solids containing some of said other metals, causing the remaining solution to be selectively precipitated in respect to other of the contained metals than iron and zinc, subjecting the solution to electrolysis to recover a cathode deposit of mixed iron and zinc, and subjecting the cathode deposit so obtained to fractional distillation in a reducing atmosphere to separate the pure iron and pure zinc.

8. The art of recovering zinc and iron comprising subjecting suitably prepared ore to repeated leaching with an iron solution, causing the solution to be selectively precipitated in respect to other of the contained metals than iron and zinc, subjecting the solution to electrolysis to recover a cathode deposit of mixed iron and zinc, and to regenerate the solution to the ferric state, returning the regenerated solution to the leaching vat, whereby to build up a concentration of the zinc in solution, and subjecting the cathode deposit so obtained to fractional distillation to separate the pure iron and pure zinc.

9. The art of recovering the pure metals from sulphide iron ores containing zinc comprising roasting the ores to lower the content of combined sulphur, subjecting the treated ore to repeated leaching with a solution containing iron in the ferric state and without free acid, subjecting the solution reduced thereby to the ferrous state to steps for the removal of solids and selective precipitation of metals other than iron and zinc, simultaneously regenerating the ferric solution and depositing iron and zinc as a cathode deposit in an electrolytic cell; returning the regenerated solution to dissolve more ore; and treating the cathode deposit by progressively increasing its temperature beyond the melting point of iron, collecting and condensing the vapor in the absence of combining elements, whereby to recover zinc as a distillate, and pure iron as a molten metallic residue.

10. That step in the art of obtaining pure metallic iron and pure metallic zinc from sulphide ores containing iron and zinc comprising the formation of a mixed friable cathode deposit of iron and zinc by electrolysis from a solution containing the salts of iron and zinc.

11. Those steps in the art of obtaining pure metallic iron and pure metallic zinc from sulphide ores containing iron and zinc comprising the formation of a mixed friable cathode deposit of iron and zinc by electrolysis from a solution containing the salts of iron and zinc, breaking up and drying the cathode deposit, and subjecting it to fractional distillation.

Signed by us at Boston, Massachusetts, and at New York, New York, this 25th day of September, and this 26th day of September, 1922, respectively.

FREDERIC A. EUSTIS.
DONALD BELCHER.